(12) United States Patent
Richmond

(10) Patent No.: US 6,420,992 B1
(45) Date of Patent: Jul. 16, 2002

(54) ON BOARD JAMMER

(76) Inventor: Martin R. Richmond, 3 Franklin Rd., Lexington, MA (US) 02173

( * ) Notice: Subject to any disclaimer, the term of this patent is extended or adjusted under 35 U.S.C. 154(b) by 0 days.

(21) Appl. No.: 05/609,454

(22) Filed: Aug. 26, 1975

(51) Int. Cl.[7] .............................................. G01S 7/38
(52) U.S. Cl. ........................ 342/14; 342/13; 342/194; 342/204
(58) Field of Search ....................... 343/18 E; 342/13, 342/14, 15, 175, 194, 200, 201, 202, 204

(56) References Cited

U.S. PATENT DOCUMENTS

| | | | | |
|---|---|---|---|---|
| 3,618,096 A | * | 11/1971 | Schoneborn ................. | 342/14 |
| 3,710,256 A | * | 1/1973 | Lewis ........................... | 455/1 |
| 3,841,219 A | * | 10/1974 | Schillreff ..................... | 102/342 |
| 3,896,441 A | * | 7/1975 | Richmond .................... | 342/15 |
| 4,006,478 A | * | 2/1977 | Lewis et al. .................. | 342/15 |
| 4,037,227 A | * | 7/1977 | Kline ........................... | 342/15 |
| 4,042,927 A | * | 8/1977 | Helms .......................... | 342/13 |
| 4,097,865 A | * | 6/1978 | Jones ........................... | 327/164 |
| 4,117,484 A | * | 9/1978 | Shizume ....................... | 342/15 |
| 4,121,214 A | * | 10/1978 | Marinaccio et al. .......... | 342/15 |
| 4,149,167 A | * | 4/1979 | Peters, Jr. et al. ............. | 342/14 |
| 4,159,478 A | * | 6/1979 | Jaklitsch et al. .............. | 342/15 |
| 4,164,741 A | * | 8/1979 | Schmidt ....................... | 342/15 |
| 4,193,032 A | * | 3/1980 | Milberger et al. ............ | 178/116 |
| 4,264,909 A | * | 4/1981 | Hamilton et al. ............. | 342/13 |
| 4,307,400 A | * | 12/1981 | Miley ........................... | 342/14 |
| 4,328,496 A | * | 5/1982 | White .......................... | 342/15 |
| 4,429,311 A | * | 1/1984 | Barewald ..................... | 342/15 |
| 5,532,696 A | * | 7/1996 | Cyrulik et al. ................ | 342/14 |
| 5,623,266 A | * | 4/1997 | Grigsby ........................ | 342/14 |
| 5,943,001 A | * | 8/1999 | Blume et al. ................. | 342/14 |

* cited by examiner

Primary Examiner—John B. Sotomayor
(74) Attorney, Agent, or Firm—Daniel J. Long

(57) ABSTRACT

A method and apparatus for jamming radar and other electromagnetic signals is disclosed in which the jammer includes a single port, keyed primed oscillator which is primed with the low level signal received at its antenna. In one embodiment the priming signal is gradually shifted in frequency to introduce a false doppler and is then injected into the tank circuit of the oscillator which is rapidly turned on and off (keyed) to produce a rapidly pulsed signal which tracks the frequency of the shifted priming signal. In this embodiment the oscillator keying unit is itself keyed to modulate the output signal of the oscillator to provide false bearing information. In another embodiment, the priming signal is injected directly into the tank circuit of the oscillator and the frequency of the output signal from the oscillator is varied to induce false doppler information. In both embodiments the pulsed signal from the oscillator is detected as a CW signal. The jammer also has a multiple threat capability in which simultaneously arriving signals from different sources result in a jammer output at each of the different frequencies of the incoming signals with sufficient jamming power at each frequency.

18 Claims, 8 Drawing Sheets

SIMULTANEOUS SIGNALS – EQUAL AMPLITUDE

A  $f_1$

B  $f_2$

C

D

INPUT MIXING

E

TRANSMITTED SIGNAL

ON BOARD JAMMER

SCOPE OF THE INVENTION

This invention relates to radar jamming systems and more particularly to the use of a primed oscillator in the production of suitable jamming signals for indicating that a "target" is at a location different from its actual location and is travelling with a velocity different from its actual velocity.

BACKGROUND OF THE INVENTION

One of the frequently occurring situations necessitating radar jamming is one in which an incoming missile homes on a "target" via a CW radar signal. This signal, when returned from a "target" is analyzed as to doppler frequency shift which provides the relative velocity of the "target" with respect to the missile, and as to modulation which provides the angular bearing of the "target". In the past, jammers for this tactical situation have involved the generation of a CW signal by the "target" in which the frequency of the signal is made to vary in a predetermined fashion to convey false doppler frequency shift information. This is commonly called "stealing the speed gate" of the "enemy" radar. Additionally, the jamming signal is modulated to convey false angular bearing information. In the prior art jamming devices, it is usually necessary to detect the frequency of the incoming radar signal and to synthetically produce a signal having this frequency. Having generated this signal, the frequency of this signal is slowly varied for the required doppler shift and is modulated to give the false bearing information.

By way of background, there have been basically three approaches to generating the above described CW jamming. The first is a CW amplification approach in which the incoming signal is amplified by a chain of amplifiers and reradiated. In this approach, the false doppler and bearing modulations are applied during amplification and two antennas are required. This approach suffers from two disadvantages. 1) A very high antenna isolation is required to prevent a ring-around type feedback between the antennas. On many installations sufficient isolation is physically impossible to achieve. 2) A separate CW power amplifier tube is required, in addition to the pulse tube which is normally carried for pulse jamming.

The second approach eliminates the antenna isolation problem by using an oscillator to generate the jamming signal. The oscillator is set on frequency by a receiver which briefly samples the received radar signal at periodic intervals. Thus, it will be appreciated that the jamming must be interrupted during these "look-thru's", so that received radar signals may be sampled. This approach suffers from the disadvantage that the receiver for the jammer is either complex or has a slow response. In addition, a separate CW power tube is still needed.

The third approach makes use of the pulsed power amplifier and simulates CW by a train of pulse bursts. The switching-off between pulses solves the aforementioned ring-around problem, and the time between bursts is available for pulse jamming other threats. However, this approach suffers a severe power/efficiency limitation because the effective power is reduced from the average power by the duty factor. By way of example, typical pulse tubes are limited to a duty factor of about 10%; therefore the effective power is only about 1% of the peak power. It will be appreciated that all of these jammers are carried "on board" the "target".

In the subject invention, the jammer is also located "on board" the "target". However, the subject jammer, unlike those of the prior art, includes a single port, keyed, primed oscillator which is primed with the low level signal received from the "enemy" radar. The received signal, in one embodiment, is frequency shifted by simple phase shifter to introduce false doppler and then this signal is coupled directly to the tank circuit of the oscillator as the priming signal. The oscillator is rapidly turned on and off (keyed) so that its output signal tracks the frequency of the priming signal as will be explained.

It is important to the understanding of the subject system to distinguish the subject priming system from traditional injection locking systems. In injection locking the injected signal is a relatively high level signal strong enough to lock the oscillator frequency to the frequency of the injected signal. The signal from the "enemy" radar normally does not reach injection locking levels at the "target" and thus injection of a received signal into a remote oscillator circuit will not lock the remote oscillator to the frequency of the received signals.

In priming, however, the injected signal need only be strong enough to force the oscillator to start up in phase with the priming signal at the start of each pulse. In the subject system there is no locking or changing of the resonant frequency of the oscillator. Rather the oscillator is allowed to run at its natural frequency and is rapidly keyed so that the oscillator is turned off before its signal can accumulate a significant phase error with respect to the priming signal. The result is that the output signal from the oscillator tracks the frequency of the priming signal to the extent that the phase difference between the priming signal and the natural frequency signal from the oscillator is small. Since this phase difference can be made very small by rapid keying, the frequency of the output signal from the keyed primed oscillator approximates or tracks that of the priming signal.

Additionally, the oscillator keying circuit may be keyed so that the output signal from the primed oscillator is modulated in such a way as to convey false bearing information.

After these alterations a rapidly pulsed output signal from the jammer is coupled to the same antenna used for receiving the "enemy" radar signal, from whence it is transmitted back to the receiving section of the "enemy" radar. The "enemy" radar cannot distinguish the individual pulses of returned energy due to the high PRF (pulse repetition frequency) of the returned signal and thus the signal from the jammer is detected as a CW signal with false doppler and bearing information thereon. The jammer also has a multiple threat capability in which simultaneously arriving signals from different "enemy" radars result in a jammer output at each of the different frequencies of the incoming signals with sufficient jamming power at each frequency.

In summary, in this embodiment the frequency of the priming signal is slowly varied prior to injection into the oscillator to establish a false doppler signal. The oscillator is thus primed with a signal of slowly changing frequency and its output signal reflects the changing input signal to produce a signal with false doppler. To this may be added a second modulation in which the oscillator keying unit may itself be keyed to impart false bearing modulation.

The primed oscillator is therefore a very simple broadband jammer which can follow the incoming frequency by virtue of the rapid keying or chopping. Due to the availability of IMPATT diode oscillators which have outputs exceeding 100 watts, amplification stages are unnecessary. Moreover since the duty cycle can be close to 100%, the effective power out of the oscillator can be very high. Since the subject system utilizes only one antenna there is no isolation problem. It is also an important feature of the primed oscillator that it can be used in its chopped or keyed mode for handling simultaneous multiple incoming signals. This comes about as follows. When two or more CW signals are present, at different frequencies, their resultant is a single signal of varying phase and amplitude. Each time the oscillator is keyed on it is primed by that resultant. Its phase on successive pulses will therefore faithfully follow the phase of the resultant signal, thereby in effect reproducing all the incoming frequencies. The failure of the oscillator output to follow the amplitude variations causes the production of some spurious frequencies. However this is not a problem other than slightly reducing the power available at the desired frequencies.

It is therefore an object of this invention to provide a system for jamming in which a primed oscillator is utilized in a rapidly keyed mode to generate a rapidly pulsed jamming signal having an apparent frequency which duplicates that of the priming signal.

It is another object of this invention to provide a jammer utilizing a rapidly keyed primed oscillator in which the signal from the oscillator is modified in such a manner that the apparent angular bearing and relative speed between the "enemy radar" and the "target" are effective altered, with the modified signal being transmitted by the same antenna that is used for deriving the priming signal.

It is a still further object of this invention to provide a jamming system in which amplifiers or amplification stages are eliminated in favor of a high power primed oscillator which is rapidly keyed to provide an essentially continuous CW signal made up of numerous packets of signals each of which is initially in phase with the incoming radar signal so that the oscillator output signal effectively tracks the frequency of the priming signal.

It is another object of this invention to provide a jamming system utilizing a rapidly keyed primed oscillator having a multi-threat capability in which the simultaneous arrival of two different signals from different "enemy" radars results in the production of a signal having frequency components which jam-radars producing the two signals.

DETAILED DESCRIPTION

Figure 1A:
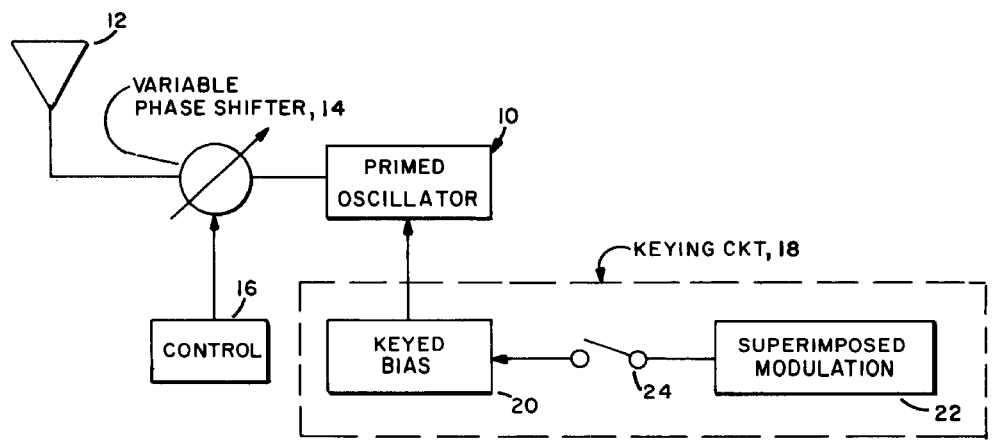
FIGS. 1A and 1B are block diagrams of two different embodiments of the subject on board jammer.

Referring to FIG. 1 the on-board jammer in one embodiment includes a primed oscillator 10 connected to an antenna 12 through a variable phase shifter 14 controlled by control unit 16. The primed oscillator is rapidly turned on and off by a keying circuit 18 which includes a keyed bias supply 20. The keyed bias supply may be periodically rendered operative and inoperative by a unit 22 which functions to provide superimposed modulation of the signal transmitted from antenna 12 when this unit is switched into the circuit via switch 24.

In operation, an incoming signal is coupled from antenna 12 through variable phase shifter 14 to primed oscillator 10 where it is introduced into the tank circuit of the oscillator. As the signal comes in it is shifted in frequency in one embodiment by the variable phase shifter by an amount determined by the phase shifter. This priming signal, which need be only a few db above the noise level at antenna 12, is utilized to prime the oscillator to the frequency of the incoming signal plus a frequency determined by the phase shift. Thus in this embodiment the priming signal may be altered slightly in frequency in a predetermined manner so that the priming signal at the primed oscillator varies in a predetermined manner to simulate a false doppler signal. The oscillator is rapidly keyed by the keyed bias supply 20, typically at a pulse repetition frequency (PRF) in excess of 10 MHz. Initially the oscillator signal starts up in phase with the priming signal regardless of the frequency to which the primed oscillator is tuned. Thereafter the phase difference between the priming signal and the natural frequency of the oscillator increases. Before this phase difference is excessive (reaches 90°) keyed bias supply 20 renders the oscillator inoperative by removing the bias voltage. The resultant output signal thus simulates the priming signal in frequency for the time that the oscillator is permitted to be on. Thereafter the oscillator is again turned on by the keyed bias supply and again is set to the frequency of the priming signal by virtue of the 0° phase difference between the priming signal and the oscillator signal. The output of the primed oscillator is coupled to antenna 12 via phase shifter 14 where the signal is again phase shifted, such that a rapidly pulsed signal is transmitted from antenna 12. Because the primed oscillator is primed with the incoming signal which is ever so slightly shifted in frequency, the output signal transmitted from antenna 12 is a signal having approximately the same frequency as the incoming signal which frequency is varied in a predetermined manner to simulate a predetermined doppler shift. This provides false doppler information to the radar initiating the original signal. The operation of primed oscillator 10 will be discussed more fully in connection with FIGS. 3–11. For present purposes however, the primed oscillator takes the priming signal and produces a rapidly pulsed signal whose frequency tracks that of the priming signal. The effect of the phase shifter is to shift the phase of the priming signal by a controlled amount, and to shift the transmitted signal again by the same amount. Thus, the round-trip phase shift is double that of the phase shifter. The phase shifter is programmed to produce a sawtooth phase modulation with an excursion of 360° (round-trip). This process is known as "serrodyning" and causes the apparent frequency to be shifted by an amount equal to the sawtooth frequency. The doppler shift can be constant or can be made to vary to simulate the speed up and slow down of the "target" during, for instance, an evasive maneuver.

As can be seen from the description of the FIG. 1A embodiment there are two phase shifts imparted, one when the signal comes in and the other when the output signal from the oscillator is coupled to the antenna. However, as can be seen from the FIG. 1B embodiment only one variable phase shift need be imparted. In this embodiment a three port circulator 26 is inserted between the antenna and the primed oscillator, with the port intermediate those coupled to the antenna and the oscillator coupled to the variable phase shifter. In this embodiment one port of the variable phase shifter is terminated in a short circuit 27.

Depending on the direction of circulation, either the input signal from the antenna is first shifted and then used as the priming signal, or the signal from the antenna is coupled directly to the primed oscillator, with the output from the oscillator then being shifted. In either case the signal finally transmitted from the antenna is doppler frequency shifted by an appropriate amount. In general one would choose to shift the priming signal and not the transmitted signal. In this way one avoids the phase shifter loss on the transmitted signal (the circulator loss will generally be less), whereas the loss to the priming signal is usually less important.

In order to introduce false bearing information, all that is necessary is to modulate the primed oscillator in such a fashion as to give the output signal therefrom this false information. In general missiles employing radar for homing purposes typically utilize a conical scan system for determining the bearing of a target. The beam from the missile is made to scan in a rotating conical manner typically at a frequency of 77 cycles per second. The phase of the amplitude modulation at this frequency determines the off-axis angle and thus the bearing of the target. By keying the keyed bias supply 20 off and on at a frequency just slightly removed from the conical scan frequency the oscillator output signal is amplitude modulated at this frequency. When this signal is detected by the missile, a rotating phase vector is induced in the missile's guidance system which causes the missile's guidance system to hunt and bearing track is lost. While there are many conventional devices for causing the output signal from a jamming device to take on a modulation calculated to induce false bearing information in the "enemy" radar, one rather simple approach with the subject primed oscillator is to merely key the keyed bias supply. Thus while the keyed bias supply may run at a frequency of 10 MHz or greater, the power to the keyed bias supply may be keyed at a much lower rate designed to induce the false bearing information. This is accomplished by superimposed modulation unit 22 connected to the system via switch 24. It will further be appreciated that if only false bearing information is desired the variable phase shifter may be eliminated from the subject circuit while if only false doppler information is required the superimposed modulation unit may be removed from the circuit.

Figure 1B:
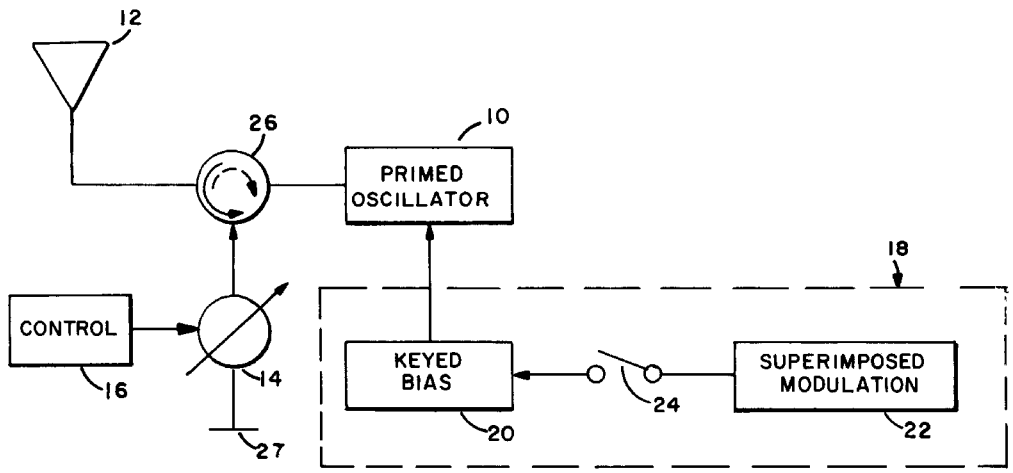
Figure 2:
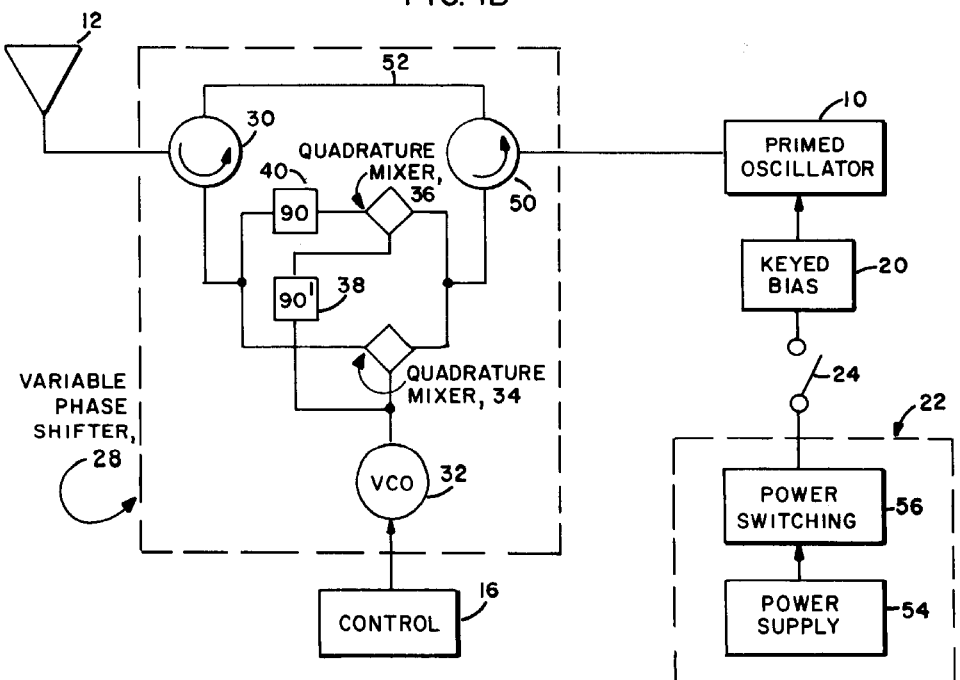
FIG. 2 is a detailed block diagram of another embodiment of the subject jammer illustrating one particular type of frequency shifter and one form of superimposed modulation unit.

While variable frequency shifters exist commercially, one such variable frequency shifter 28, which may be utilized to advantage in the subject circuit is illustrated in FIG. 2 wherein like elements to those of FIGS. 1A and 1B are designated with like reference characters. The variable frequency shifter in this embodiment includes a circulator 30 having one port thereof connected to antenna 12. The next port after the antenna port in the direction of the circulating arrow is connected to a quadrature mixing circuit which mixes the input signal with a locally generated oscillator signal so that a certain heterodyning action occurs. The quadrature mixing circuit includes a voltage controlled oscillator 32, controlled by control unit 16, which produces an output signal coupled to one port of a quadrature mixer 34 and to a corresponding port of a quadrature mixer 36 through a 90° phase shifting device 38 of conventional design. The last mentioned port of circulator 30 is coupled to another port of quadrature mixer 34 and through a 90° phase shifter 40 to another port of quadrature mixer 36. The output ports of the quadrature mixers 34 and 36 are coupled together and coupled to an input port of a conventional three port circulator 50 which couples the input signal from antenna 12, frequency-shifted, to the primed oscillator. The output signal from the primed oscillator is coupled back to circulator 50 and out through its third port to circulator 30 and thence to antenna 12. In this manner slight frequency shifts are introduced into the priming signal and this signal is utilized to prime the primed oscillator. As will be appreciated, frequency shifting of the signal from the primed oscillator may be accomplished in a number of ways by conventional means and no limitation is intended by the description of any of the embodiments illustrated.

As mentioned hereinbefore, the modulation which results in a false bearing signal may be superimposed on the output signal from the primed oscillator in a variety of different ways. For instance, variable amplitude attenuators could be located in path 52 between circulator 50 and circulator 30. A perhaps more convenient method of introducing the appropriate modulation is to provide that the superimposed modulation unit include a switched power supply involving a power supply 54 and a switching unit 56 which provides that the power to the keyed bias supply be chopped or keyed in a predetermined fashion to amplitude modulate the primed oscillator. It will be apparent that by proper power switching the primed oscillator output may be given a modulation characteristic which will induce a bearing error at the radar receiving the signal. If this is done, the output from the subject jamming device will be a rapidly pulsed signal having a frequency approximating that of the incoming signal, slight frequency shifts to simulate a false doppler signal, and a modulation which will give false bearing information to the enemy radar.

What is now described is the manner in which the primed oscillator signal simulates the incoming signal which for present purposes will be assumed to be a CW signal. What is necessary is for the primed oscillator to produce a signal which approximates a CW signal at the frequency of the incoming signal. Once having generated such a signal it will be apparent that this output signal can be modified to provide the various jamming characteristics.

The Primed Oscillator

An explanation of the primed oscillator phenomenon is now presented as it relates to a typical CW jamming situation.

Figure 3A:
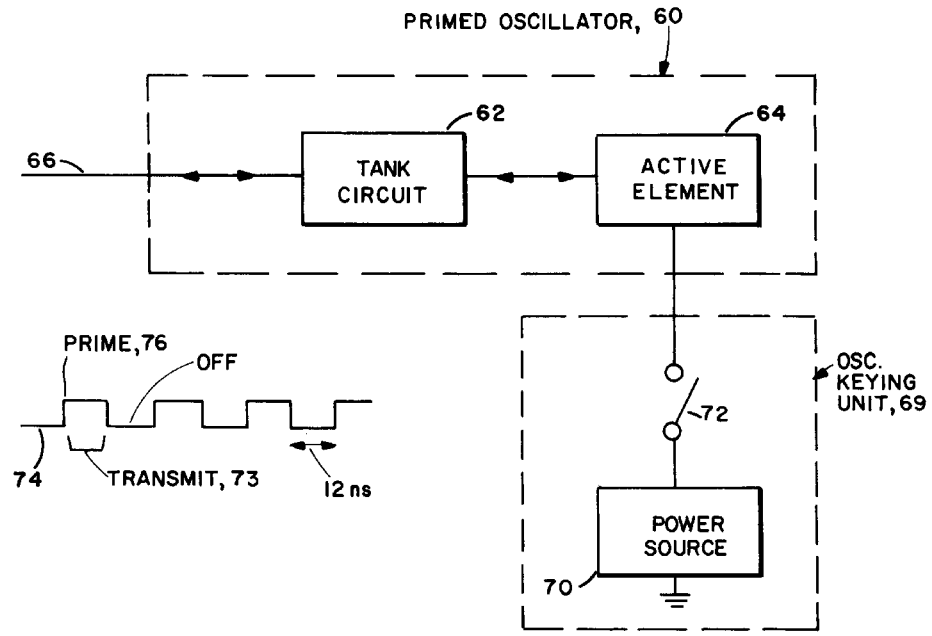
FIGS. 3A–3C are diagrams and diagramatic representations of a keyed, single-port primed oscillator in which a priming signal is coupled into the tank circuit of the oscillator.
Figure 3B:
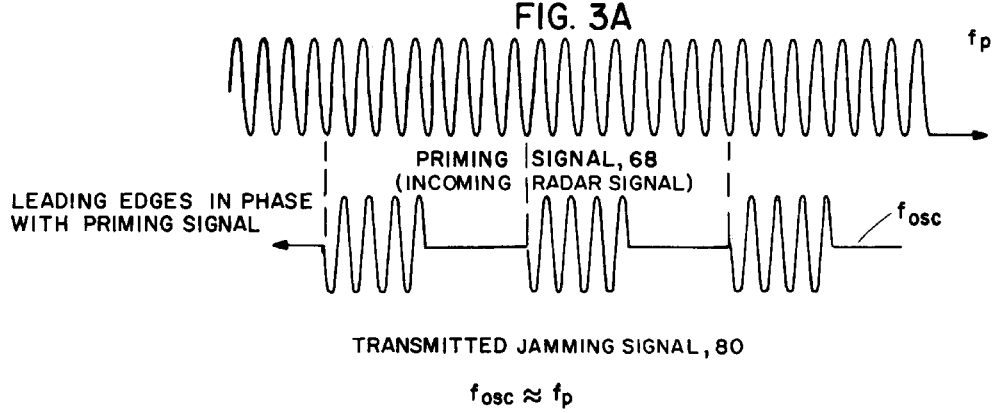

Referring now to FIG. 3A the subject jammer includes a primed oscillator 60 which typically includes a tank circuit 62 and an active element 64 which may be any type of negative resistance element. In this embodiment, the oscillator is a one-port oscillator. A priming signal on line 66 may be directly coupled to the tank circuit via this port so that incoming signals 68 (FIG. 3B) may be coupled directly into the tank circuit via this port, and so that output signals may be coupled from this port directly back to the antenna. For purposes of discussion the incoming signal will be assumed to be a CW signal having a frequency $f_p$. The incoming signal is utilized as a priming signal and need be only a few dB above the ambient noise level (i. e. many tens of dB below the oscillator output level). This distinguishes the subject system from injection locking systems in which the amplitude of the injected signal is only a few tens of dB below the output signal from the oscillator.

Figure 3C:
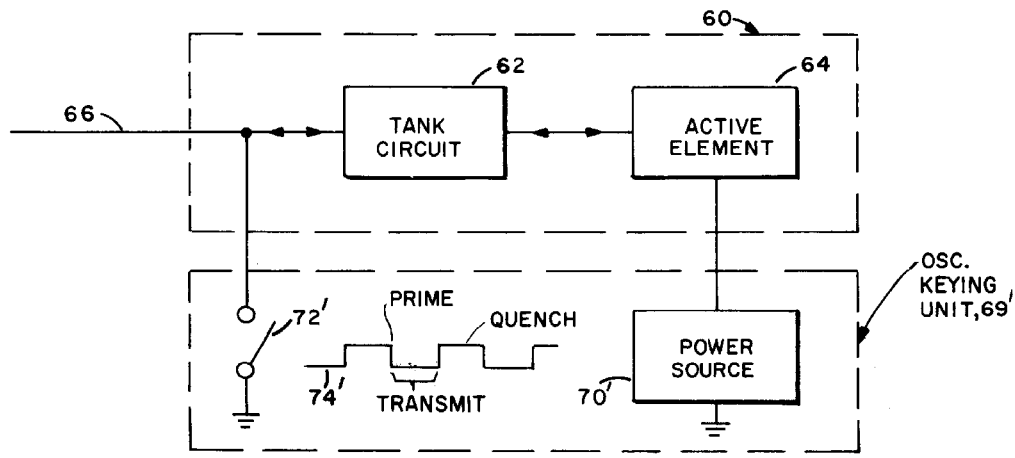

In the embodiment shown in FIG. 3A, the oscillator is turned on and off by an oscillator keying unit 69 which includes a power source 70 connected to active element 64 via a switch 72 provided to interrupt the power to the oscillator periodically. Alternatively, as illustrated in FIG. 3C, the keying unit may operate a switch 72' to periodically short the tank circuit. The shorting of the tank circuit is referred to herein as "quenching".

In FIG. 3A switch 72 is actuated in accordance with pulsed waveform 74 such that this switch is closed when the waveform is high and open when the waveform is low. In the FIG. 3A embodiment upon closing of switch 72, oscillator 60 is turned on and is primed at the instant of time that the switch contacts close. This is indicated by arrow 76. Thereafter the oscillator is allowed to run for approximately 12 nanoseconds thereby to transmit a signal along line 66 during the time interval illustrated at 73. At the end of this cycle switch 72 is opened and the oscillator is turned off. This produces a rapidly chopped signal 80 (FIG. 3B) made up of wave packets. As will be described, the pulse repetition frequency (PRF) of this signal is made high enough so that the primed oscillator effectively tracks the frequency of incoming signals. In this description it will be noted that the higher the keying rate, the better will be the simulated frequency following or tracking of the oscillator output signal. It is a property of the keyed primed oscillator that when the oscillator is turned on the oscillator signal is in phase with the incoming signal. Although the oscillator always oscillates at its natural frequency, because the phase difference between the oscillator signal and the priming signal starts out being 0°, if the oscillator is turned off before this phase difference can build up to 90°, the oscillator output signal will "simulate" the priming signal in frequency. For priming signal frequencies within a band of, for instance 20 MHz of the oscillator's natural frequency the phase difference will not build up to 90° for many hundreds of cycles. Thus the oscillator output can "track" the frequency of the incoming signal within limits set by the oscillator keying rate. This rate for effective frequency following is generally on the order of 10 MHz or greater for microwave frequencies, although frequency following has been noted at keying rates as low as 1 KHz.

By way of summary, it will be appreciated that the ON-time of the oscillator must be short enough to permit a maximum frequency difference between the priming signal frequency and the natural frequency of the oscillator. The shorter the ON-time the greater will be the frequency response of the jammer and the less excessive will be the phase error. Concomitantly the duty cycle of the oscillator must be kept high (50%–75%) to maintain efficiency, although speed and duty cycle will depend in the limit on oscillator rise and decay times. It will be appreciated that the resulting PRF's will always be much higher than the "enemy" receiver bandwidth, so there exist a large range of keying rates which can be chosen. Moreover there need be no necessary correlation between the chopping or keying rate and the frequency of the incoming priming signal. Thus, in the subject jamming system, the oscillator circuit can be tuned to a fixed frequency and yet respond properly to a wide range of frequencies. This differs from prior art jamming systems in which the oscillator must be tuned to accomodate the different frequencies of the incoming radar signals. While the duty cycle of the keying circuit is important with respect to the average output power from the jammer, as long as the keying is relatively rapid, the ability of the jammer to follow the frequency of the incoming signal will not be impaired by use of a wide range of duty cycles. In one operative embodiment of the subject invention duty cycles of 50–75% at a frequency of 14 MHz provided adequate frequency following over a frequency range of ±100 MHz and CW signal simulation.

The primed oscillator may take on the form of any oscillator whatsoever, which is rapidly turned off and turned on in a periodic fashion. In the microwave region of the electromagnetic spectrum transistor oscillators, GUNN diode oscillators and IMPATT diode oscillators have been found effective. Moreover, 100 watt IMPATT diode oscillators have been fabricated. While the subject system will be described in terms of IMPATT diode oscillators it will be understood that any keyed oscillator having a priming signal injected into its tank circuit is within the scope of this invention. Moreover, as illustrated by keying unit 69' in FIG. 3C, the keying unit can take on a number of different forms. In this embodiment power is continuously supplied to the oscillator by power source 70' and switch 72' is keyed in accordance with waveform 74' such that when switch 72' is closed the tank circuit is shorted and the oscillator is turned off.

Figure 4:
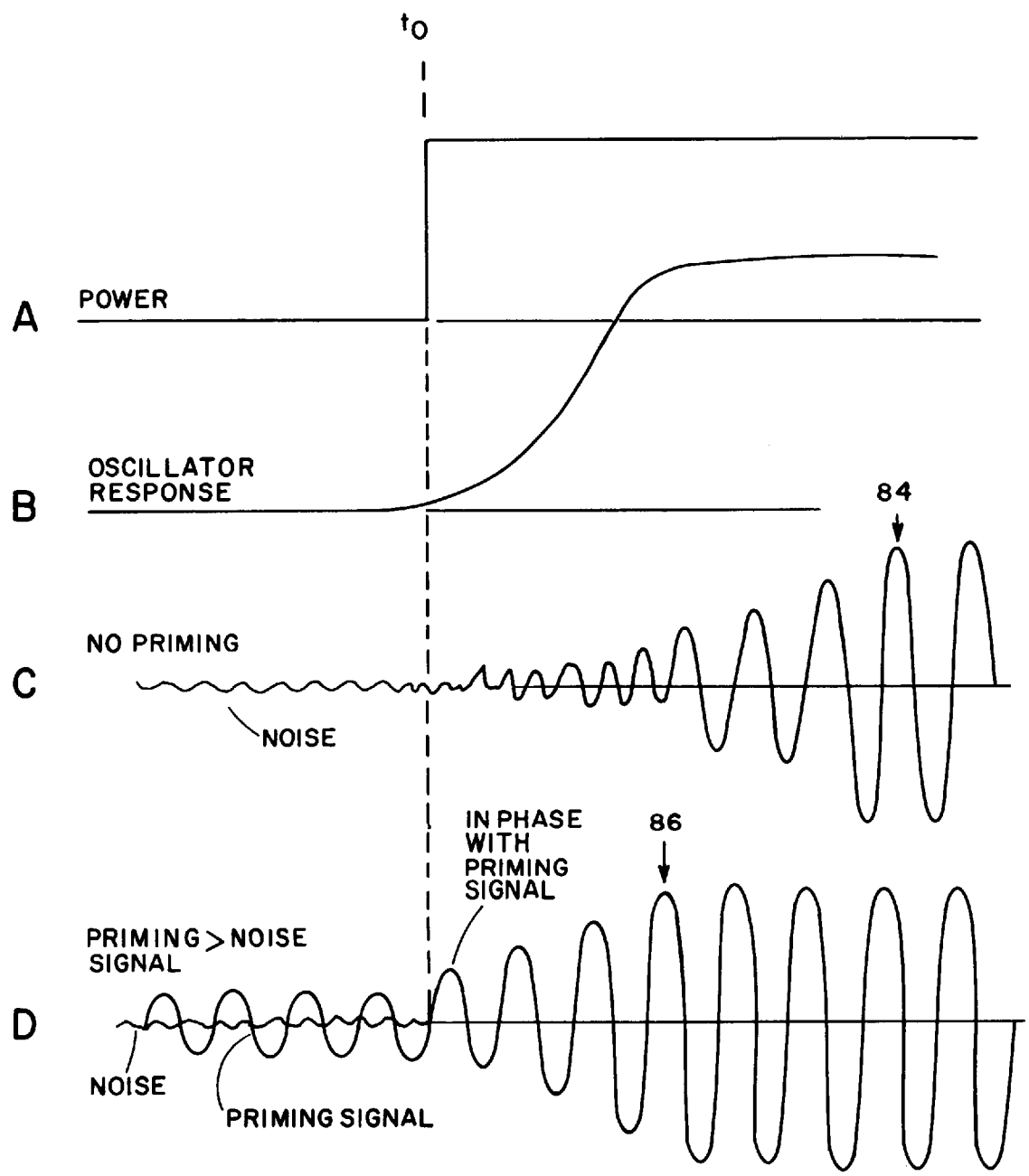
FIG. 4 is a waveform diagram illustrating the operation of the primed oscillator with and without priming signals.

Referring now to FIG. 4, the series of waveforms presented describe the operation of the primed oscillator during the instant of time in which the power is applied to the oscillator and immediately thereafter. Waveform A indicates a step function power characteristic in which power is instantaneously applied at time $t_0$. This is equivalent to unquenching the oscillator. Waveform B represents the amplitude of the oscillator signal responsive to the application of power. In accordance with waveform C when there is no priming signal, at time to the oscillations of the oscillator will be in step with the phase of the noise signal then existing at the oscillator tank circuit. The oscillator signal gradually builds up until such time (as indicated by arrow 84) that its maximum amplitude is reached. At this time the oscillator will be oscillating at its natural frequency. In accordance with waveform D, however, the priming signal is greater than the ambient noise level. As can be seen from waveform D, at time $t_0$ the oscillator signal is initially in phase with the priming signal and builds up in phase with the priming signal until maximum amplitude is reached as indicated by arrow 86. It will be appreciated that when a priming signal is applied, the oscillator reaches maximum amplitude more quickly than in the unprimed case. When a priming signal is applied and the oscillator is turned ON several cycles of the oscillator signal are in phase with the priming signal and this phase coherency gradually degrades as time goes on. The speed of the degradation depends on the frequency difference between the natural frequency of the oscillator End that of the priming signal. This phenomenon is illustrated in connection with FIG. 5.

Figure 5:
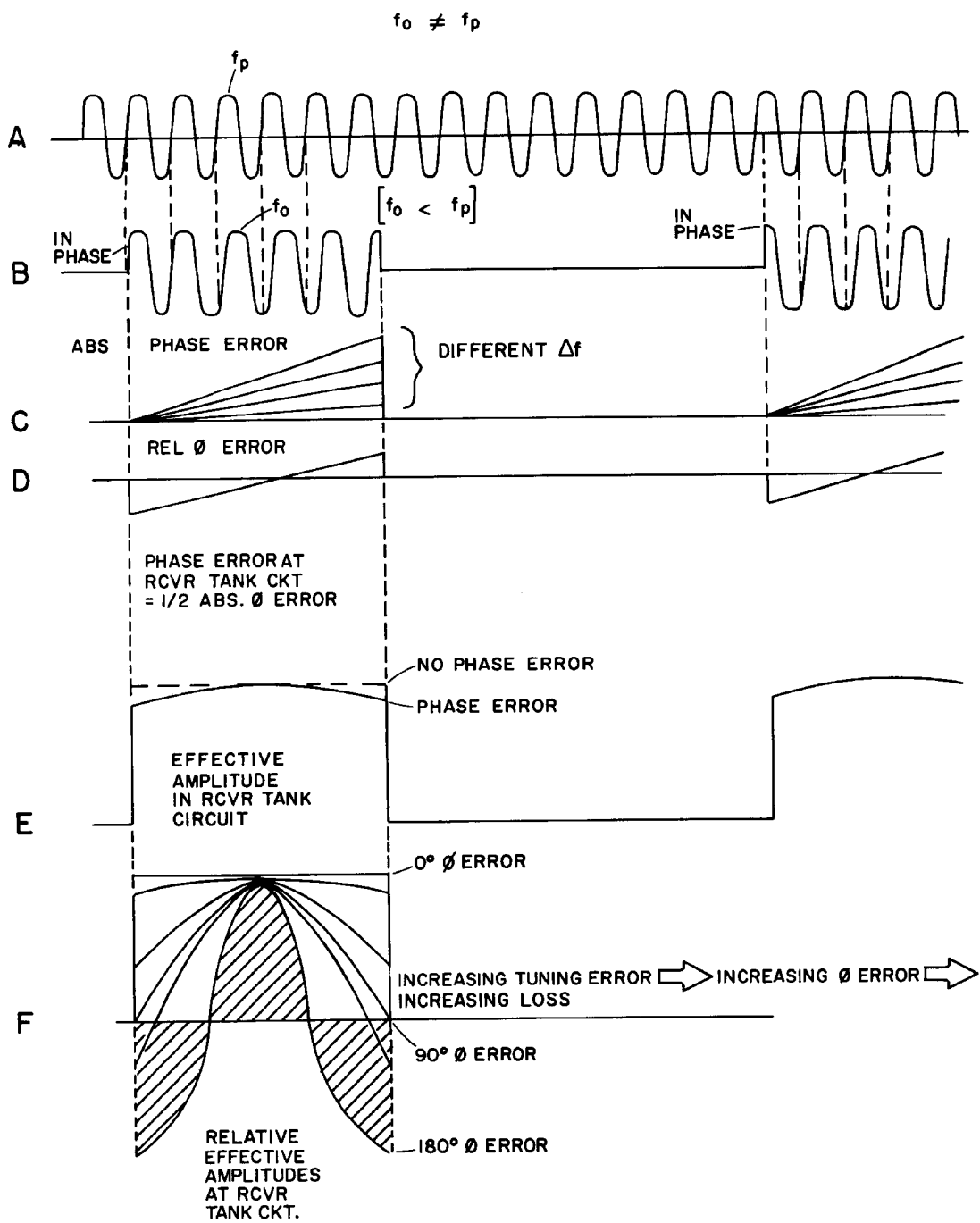
FIG. 5 is a waveform diagram illustrating the operation of the primed oscillator in the time domain with respect to the increasing phase error during the transmitted pulse and also the effective amplitude in the receiver of the "enemy" radar with respect to this phase error.

Turning now to FIG. 5, waveform A represents a priming signal having a frequency $f_p$, where $f_p$ is different from $f_0$, the natural frequency of the oscillator. The oscillator output signal is illustrated by waveform B. As can be seen, the cycles in waveform B start off in phase with those of the priming signal. As time increases, waveform B becomes increasingly more out of phase with waveform A and generates a phase error as illustrated at C. This phase error is generally linear, with different slopes indicating different $\Delta f$'s, the difference in frequency between the priming signal and the natural frequency of the oscillator. This phase error is absolute phase error. The relative phase error is given by waveforms illustrated at D such that a maximum absolute phase error of 90° is converted into a relative phase error of 45° at the receiver tank circuit. The effective amplitude in the receiver tank circuit is indicated at E. Increasing phase error results in a decrease in amplitude at the beginning and end of the pulsed signal. As illustrated at F, increasing tuning error results in increasing phase error which results in increasing loss such that with a 180° phase error there is signal cancellation. It is a finding of the subject invention that the subject system can operate effectively with up to 90° relative phase error.

In operation, the subject on board jammer operates against a CW conical scan mode missile-carried radar. The jammer is capable of responding to a signal as low as −50 dBm and transmit a coherent signal of +19 dBm to yield a 0 dB jam-to-signal ratio (J/S) at short range. For a constant output power jammer, this is equivalent to 69 dB of gain. Since in one embodiment the "enemy" radar within the missile is known to have a 500 hz doppler filter it is also important that the transmit power be "on frequency". In one embodiment the range of the on board jammer is between 2 and 20 miles.

It should be noted that the tank circuit of the receiver has a response time of about 2 milliseconds such that it cannot discriminate against pulse trains of greater than 1 KHz. Pulse trains of 1 KHz PRF thus are detected as CW signals.

Figure 6:
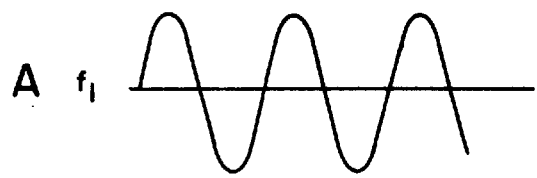
FIG. 6 is a diagramatic representation of the multi-threat capability of the primed oscillator illustrating the case in which simultaneous signals of different frequencies but of equal amplitudes arrive at the jammer.
Figure 6:
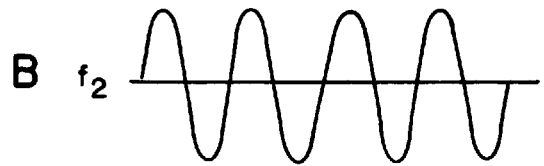
Figure 6:
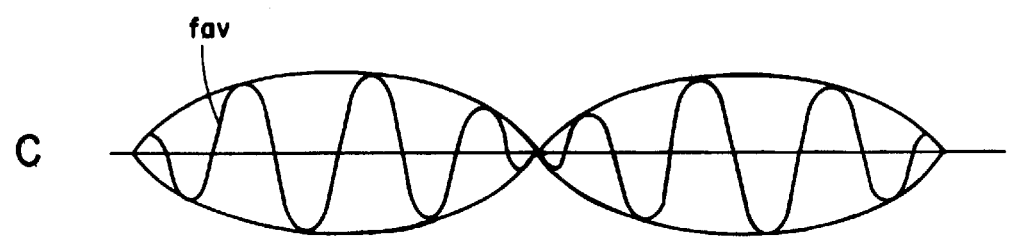
Figure 6:
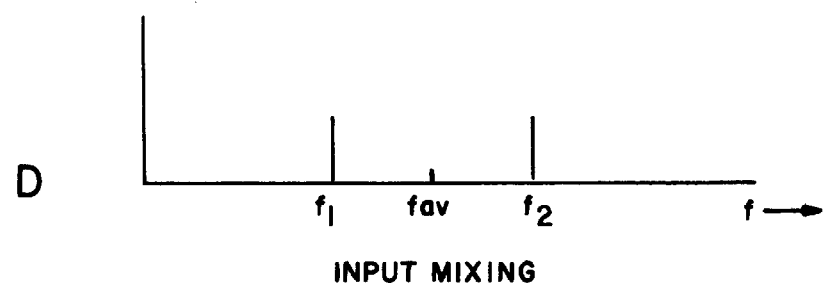
Figure 6:
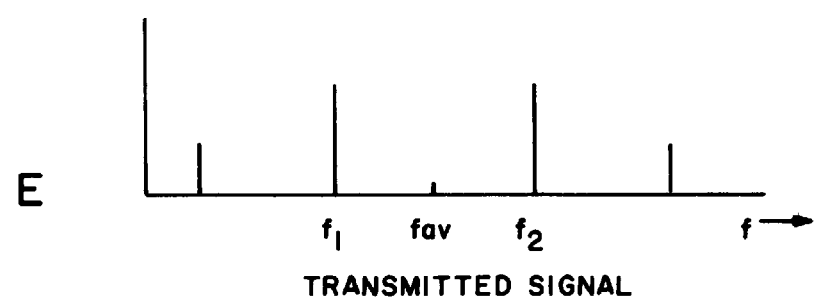

It is one of the unique features of the subject jamming system that the subject system can handle simultaneous signals of different frequencies coming in from different "enemy" radars with the use of a single antenna and a single-port oscillator. The manner in which the system can handle signals of two different frequencies arriving simultaneously is illustrated in conjunction with FIG. 6. Referring to FIG. 6, assuming an incoming signal having a frequency $f_1$, as illustrated by waveform A and a simultaneously arriving signal having a frequency $f_2$ as indicated by waveform B with both signals having the same amplitude, these signals are mixed (waveform D) in the tank circuit of the oscillator as the priming signal such that, as illustrated by waveform C, a signal exists which is the equivalent of a double sideband-suppressed carrier signal with a carrier frequency of $f_{av}$, the average of the two signals.

Because the oscillator in effect "clips" the envelope of waveform C, the resulting transmitted signal as illustrated by graph E has a component at $f_1$ and another component at $f_2$ with further sidebands existing at reduced power levels. Thus the transmitted signal has the required components to jam the two "enemy" radars producing the two simultaneously arriving signals.

Figure 7:
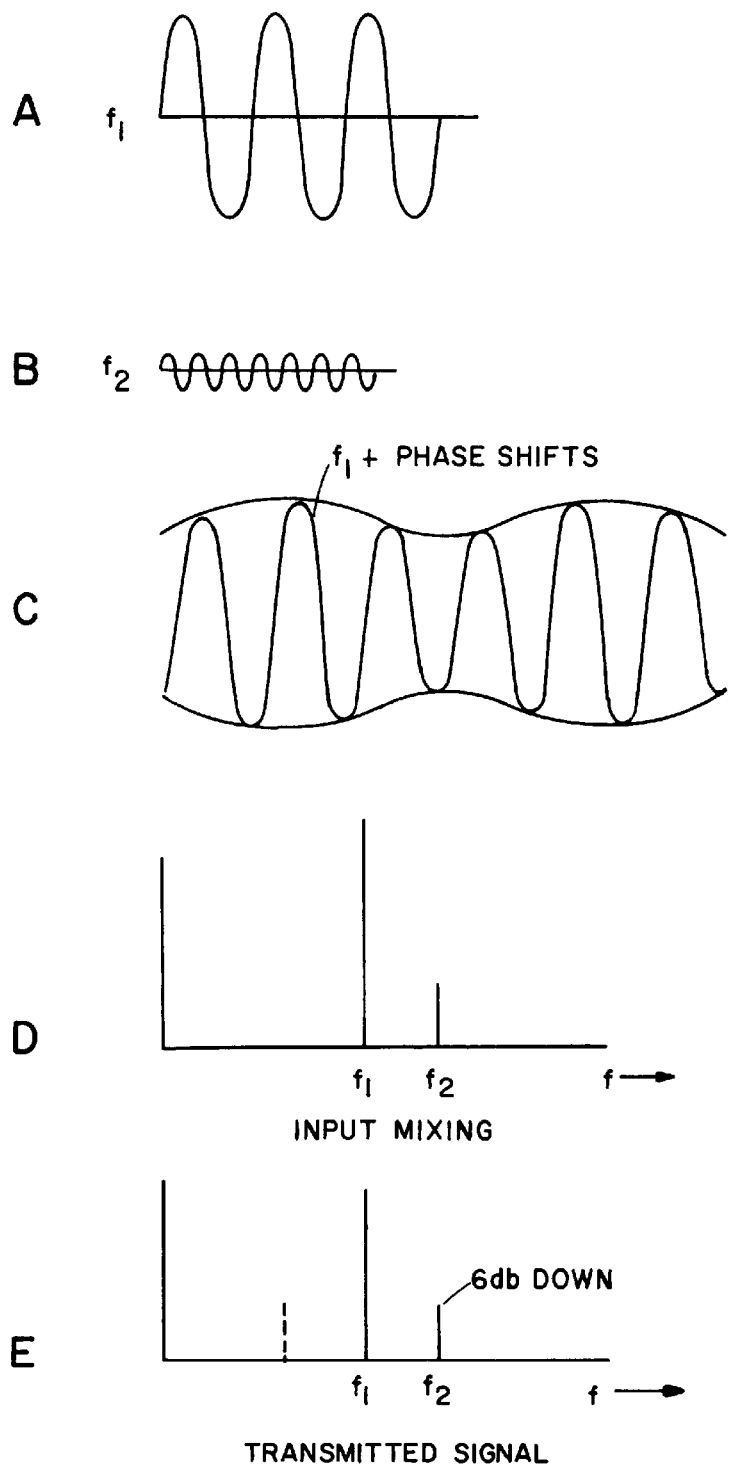
FIG. 7 is a diagramatic representation of the multi-threat case in which signals of different frequencies and unequal amplitudes are simultaneously present at the jammer.

The aforementioned case relates to the simultaneous arrival of signals of equal amplitude. As illustrated in FIG. 7 simultaneous signals of unequal amplitude result in the transmission of components of sufficient amplitude to jam the enemy radars producing each of the signals. In this figure considering waveform A the signal having a frequency $f_1$ and a rather large amplitude; and considering waveform B signal at $f_2$ having a relatively small amplitude, the input mixing signal is illustrated by waveform C with the envelope as shown and with the signal within the envelope having a frequency $f_1$ with some minor phase shifts. As illustrated by Graph D of this figure the input mixing components will have a strong component at $f_1$, and a somewhat weaker component at $f_2$. The transmitted signal as illustrated in Graph E includes a strong component at $f_1$ a moderately reduced component at $f_2$ and a symmetrical image component below $f_1$. While it will be appreciated that the amplitude of the $f_2$ component may be 6 db further down from that of the $f_1$ component than it was at the input this component will still be sufficient to jam the "enemy" radar producing the $f_2$ signal. The extension to more than two signals is obvious.

Thus the subject system has a unique capability of handling multiple simultaneously arriving radar signals by producing a number of components each having a frequency equal to that of one of the various incoming signals and an amplitude sufficient to jam the corresponding "enemy" radar.

Figure 8:
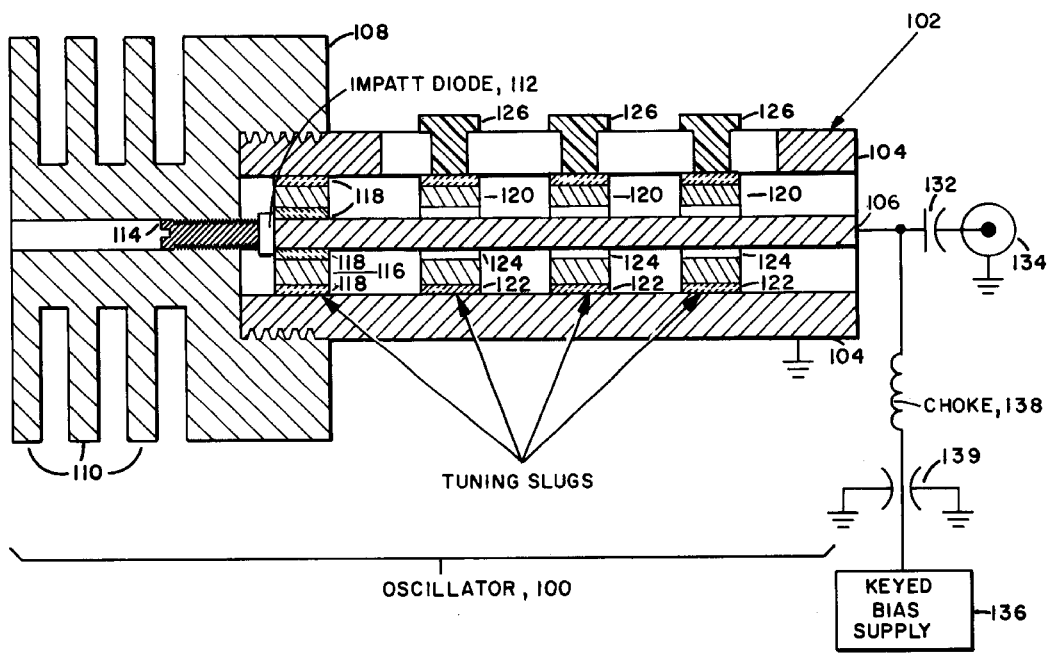
FIG. 8 is a sectional and schematic diagram of an IMPATT diode oscillator for use with the subject system.

As mentioned hereinbefore in one embodiment the subject jammer may include a primed oscillator having an IMPATT diode as its negative resistance element. This diode is an avalanche diode which breaks down very rapidly once its reverse bias breakdown voltage has been reached. In one configuration, as illustrated in FIG. 8, the IMPATT diode primed oscillator may be fabricated in coaxial form. In this embodiment an oscillator 100 includes a section of coaxial line 102 having an outer cylindrical conductor 104 and a centrally located inner conductor 106. This section of coaxial line is secured to a metallic end piece 108 which is provided with annular fins 110 for dissipating heat. An IMPATT diode 112 is sandwiched between the end of conductor 106 and a set screw 114 electrically and mechanically connected to end piece 108. Adjacent to IMPATT diode 112 and coaxially located with respect to conductor 106 is a fixed electronically conductive tuning slug 116 which is insulated from outer conductor 104 and inner conductor 106 by two annular rings of dielectric material generally indicated by reference characters 118. This tuning slug functions as a K inverter (a so-called "lumped element") to provide a parallel LC circuit across the terminals of the diode. Adjustable electrically conductive tuning slugs 120 are provided down the length of the coaxial section. These slugs are insulated from the outer conductor via annular rings 122 of dielectric material and from the inner conductor by air gaps 124. Each of these tuning slugs is adjustable along the longitudinal axis of the coaxial section and is clamped in place via dielectric set screws 126. Each of the tuning slugs provides a phase shift of 90° and acts as a K inverter.

Figure 9:
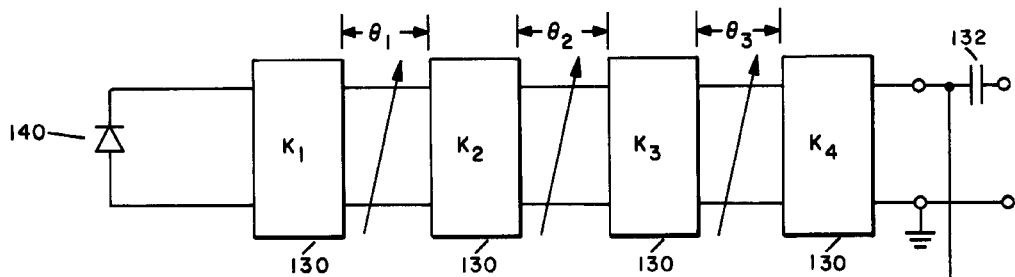
FIG. 9 is a schematic diagram of the IMPATT diode oscillator of FIG. 8.

Schematically illustrated, as can be seen from FIG. 9, the subject oscillator may be considered as including a number of K inverters 130 with the spacing between the inverters, θ1, θ2, and θ3 being adjustable. This in essence forms a circuit analogous to a shunt resonator, followed by a series resonator, followed by a shunt resonator, etc. The use of K inverters in this manner is well known as described in the MIT Radiation Laboratory Series Vol. 9, McGraw-Hill, 1948, pps. 466–472. This phenomenon is also described in Microwave Filters, Impedance-matching Networks and Coupling Structures by George L. Matthaei, Leo Young and E. M. T. Jones published by McGraw Hill Inc. in 1964. It will be appreciated that by appropriate setting of θ1, θ2, and θ3 the subject oscillator may be given a resonant frequency which is in the center of the desired frequency band. In one operative embodiment θ1=87°, θ2=23.5° and θ3=212°, for a resonant frequency of 6.4 GHz, where θ=S/λ and S is the gap or separation between adjacent tuning slugs.

Referring back to FIG. 8, the output of the oscillator may be taken from the open end of the coaxial section such that inner conductor 106 may be coupled through a capacitor 132 to an input/output connector 134 of conventional design. Biasing for the IMPATT diode is accomplished via keyed biased supply 136 which supplies a bias potential through an RF choke 138 to inner conductor 106. It will be appreciated that capacitor 132 removes all DC components from the output signal of the oscillator. A capacitor 139 is provided which operates in conjunction with the RF choke to minimize spurious signals as a result of the keying of the bias supply.

It is the function of the keyed bias supply to maintain the IMPATT diode just below its reverse bias breakdown voltage and then to cyclically provide the breakdown bias. This results in the rapid switching on and off of the oscillator so that the priming signal will have the desired effect even when the priming signal is some 60 to 80 db down from the signal at the output of the oscillator. In one embodiment the keying frequency is in excess of 14 MHz with a 50–75% duty cycle.

Figure 10:
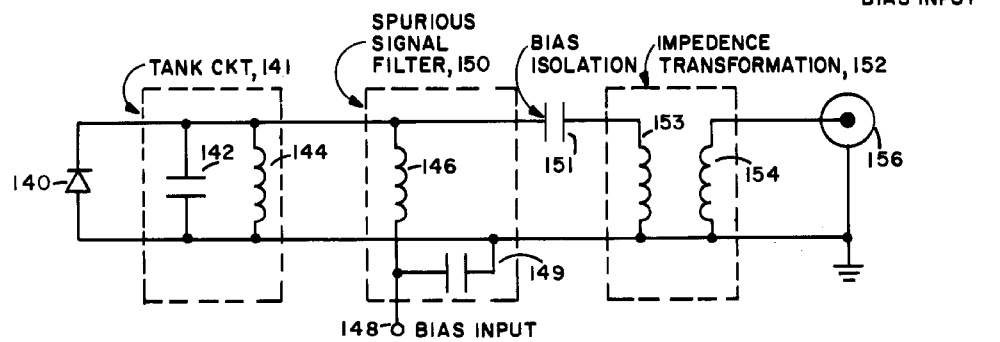
FIG. 10 is a low frequency analog of the IMPATT diode oscillator of FIG. 9.

While a strict low frequency schematic diagram of the oscillator is difficult to draw, an analogous low frequency oscillator schematic is illustrated in FIG. 10 to aid in the explanation of the oscillator. In this circuit an IMPATT diode 140 is connected across a parallel LC tank circuit 141 comprised of capacitor 142 and inductor 144. A further inductor 146 is coupled from a bias input terminal 148 to the cathode of the IMPATT diode. A capacitor 149 is coupled from this terminal to the anode of the diode and the anode is grounded as illustrated. This provides a spurious signal rejection filter 150. The cathode of the diode is connected through a D.C. blocking capacitor 151 to an impedance transforming circuit 152 comprising inductors 153 and 154 each of which have one side grounded. This is analogous to the $K_2$–$K_4$ inverters of FIG. 9. The free end of inductor 153 is connected to capacitor 151 and the free end of inductor 154 is connected to a coaxial output terminal 156 whose outer conductors grounded. While strict analogy to the high frequency schematic is not possible, it will be appreciated that circuit elements 142 and 144 comprise a tank circuit tuned to a predetermined frequency. Inductor 146 corresponds to an RF choke coil with capacitor 149 functioning therewith to filter out spurious signals. Capacitor 151 functions to isolate the bias from the impedence transforming circuit which is comprised of inductors 153 and 154.

Thus it can be seen that the first K inverter, $K_1$, is analogous to a tank circuit which determines the resonant frequency of the oscillator. The remaining K inverters act as further resonating sections.

It will be appreciated that the oscillator thus described is one of a great many types of oscillators which may be utilized in the subject invention. In this oscillator bias is selectively gated to the oscillator which is maintained at a bias level just below that necessary to render the diode operative. Thus rapid chopping or keying of the oscillator is possible. As mentioned hereinbefore, other types of biasing circuits may be utilized such that power is continuously supplied to the oscillator, with the keying or chopping being accomplished by selectively shorting the tank circuit to prohibit the oscillator from oscillating. In either case, whether power to the oscillator is interrupted or whether the tank circuit is shorted, the effect is the same of rapidly turning on and off the oscillator.

Figure 11:
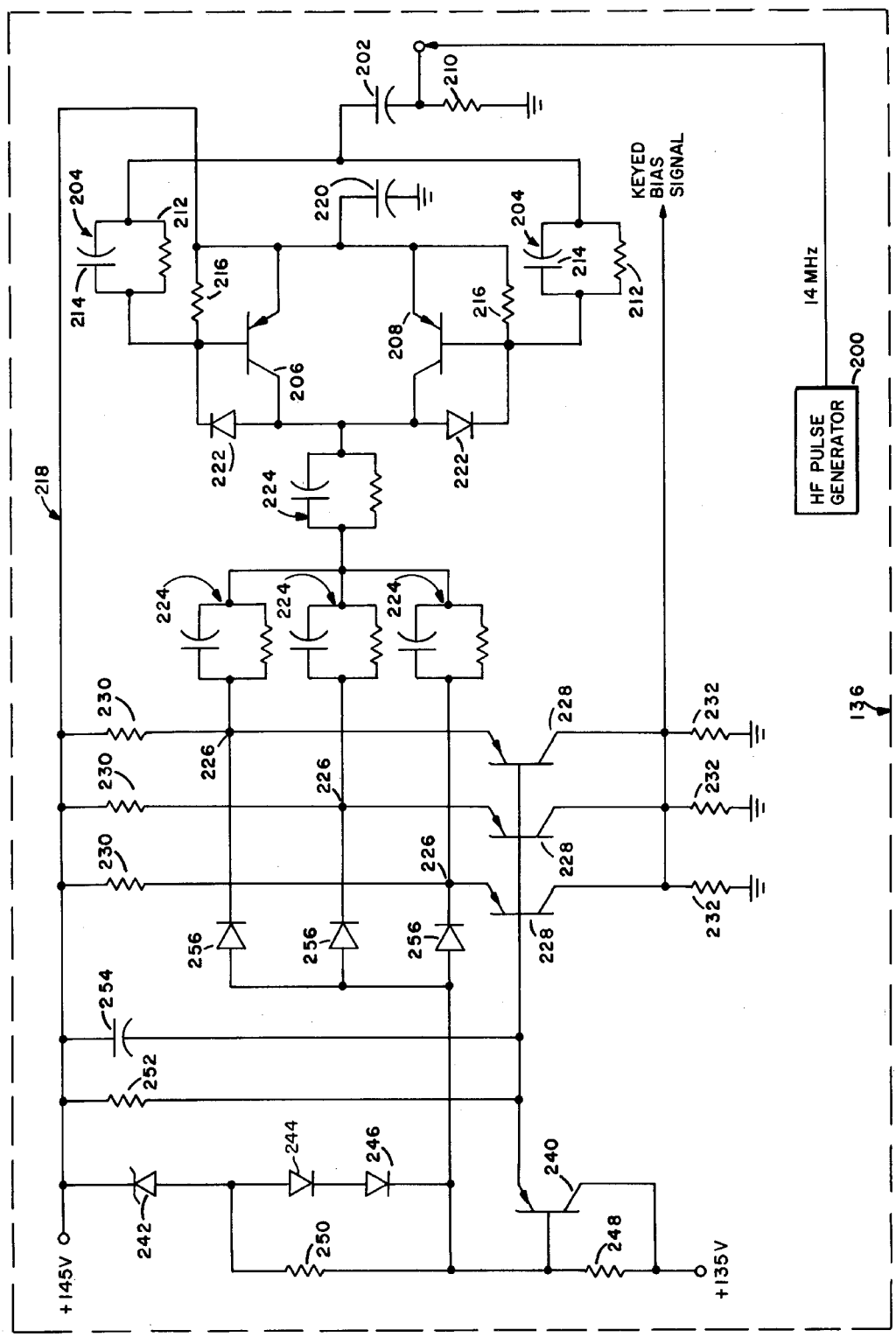
FIG. 11 is a schematic diagram of the keyed bias supply of FIG. 8.

In order to complete the description of the embodiment illustrated in FIG. 8 the keyed bias supply 76 is illustrated schematically in FIG. 11. It is the purpose of this bias supply to provide a high voltage, high current bias signal to the primed oscillator. In order to accomplish this, the bias circuit is fed via the output signal of a high frequency pulse generator 200 of conventional design which in one embodiment delivers a pulsed signal which goes from 0 volts to –5 volts at its output.

Referring now to FIG. 11, high frequency pulse generator 200 produces a high frequency pulsed output signal on the order of 14 MHz or higher in one embodiment. This signal is coupled via a coupling capacitor 202 and "speed up" networks 204 respectively to the bases of parallel-connected switching transistors 206 and 208. A resistor 210 is provided as a load for the pulse generator. The "speed up" networks are each comprised of a resistor 212 and a capacitor 214 in parallel therewith. The purpose of the resistors is to equalize the trigger signals to the switching transistors while the capacitors are utilized to cancel the capacitance effect of the base-emitter junction of these transistors such that the rise time for the switching circuit is minimized. Resistors 216 from a high voltage bus 218 carrying in this case 145 volts provide that transistors 206 and 208 are rendered non-conductive when there is no negative going input signal from the pulse generator. It will be appreciated that the bases of transistors 206 and 208 are at the same potential as the emitter of these transistors until such time as the negative going 5 volt signal from the high frequency pulse generator is coupled to the base of these transistors. A bypass capacitor 220 is coupled between the emitters of these transistors and ground for removal of any high frequency signal components on the D.C. bus. Protective diodes 222 are connected as shown to protect the base-emitter junctions of these transistors against power supply failure.

Upon being rendered conductive, 145 volts from bus 218 is applied through the switching transistors to a second set of "speed up" circuits, each composed of parallel connected resistor-capacitative pairs 224. The resistors in these pairs determine the additional current applied to points 226 which are connected to the emitters of high powered transistors 228 as shown.

High power transistors 228 are normally biased into conduction via the potential applied to the bases thereof and via resistors 230 connected between the 145 volt bus and the emitters of the high power transistors. In the absence of a keying signal from the high frequency pulse generator, transistors 228 are in a condition of limited conduction such that the voltage across resistors 232 connected between the collectors of transistors 228 and ground is approximately 90–100 volts. This 90–100 volt potential is applied as a bias potential to the oscillator to maintain the IMPATT diode just slightly below its reverse bias breakdown voltage. Upon the application of the additional potential to points 226, additional current flows through the high power transistors thereby raising the potential at the collectors of these transistors to 135 volts which exceeds the reverse bias breakdown of the IMPATT diode in the oscillator. Since resistors 230 determine the quiescent current through transistors 228, it will be appreciated that the additional current available from the switching transistors through the resistive elements of the resistor-capacitor pairs 224 provides additional current through the high power transistors such that the potential at the junction between the collectors of the high powered transistors and their associated collector resistors increases. The voltage swing therefore, rather than being a full 145 volts, is closer to 35 volts which results in considerable switching speed for the keyed bias supply. As such the subject circuit will work at close to 40MHz thereby providing improved frequency tracking for the primed oscillator by the very rapid keying.

High power switching transistors 228 which may be obtained commercially from Motorola Inc. as model no. 2N5160 are normally biased into conduction at a fixed level by an emitter follower stage which includes a transistor 240 the base of which is controlled by a zener diode 242 and compensating diodes 244 and 246 connected in series such that the base of this transistor is maintained at a fixed potential below that of the 145 volt bus. The collector of this transistor is connected to a 135 volt bus with a resistor 248 being connected between this bus and the base of transistor 240. A current shunting resistor 250 is provided across compensating diodes 244 and 246 to shunt current away from these diodes so that their ratings may be minimized.

In operation, the subject biasing circuit maintains the base of the high power transistors at 5.6 volts below the 145 volt bus, which voltage is very accurately controlled by virtue of the zener diode drop and the drop across the compensating diodes which compensate for the variable voltage drop across transistor 240 with temperature. This base bias for the high power transistors in conjunction resistors 230 sets the quiescent current through the high power transistors. A resistor 252 is provided between the high voltage bus and the emitter of transistor 240 to keep the emitter follower stage at a reasonable current level when there is no keying. A bypass capacitor 254 shunts all AC signals away from the base of the high power transistors to the high voltage bus and thence to ground via capacitor 220. Diodes 256 are provided between the base of transistor 240 and the emitters of high power transistors to prevent breakdown of the base-emitter junctions of the high power transistors and the emitter follower transistor due to power supply failure.

It will thus be appreciated that the subject bias keying circuit provides an exceptionally rapid rise time high current bias pulse to the primed oscillator, with the speed of the bias switching being accomplished not only by the small voltage swing utilized in breaking down the IMPATT diode but also by the so-called "speed up" circuits which function basically to nullify the stray capacitance effect of the transistors involved in the circuits. The high current capability is provided by three parallel-connected switching transistors which are utilized in place of a single even higher power transistor which of course could be utilized. Moreover it is possible to eliminate current shunt resistor 150 with appropriately rated diodes.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. A jamming system adapted to be carried on board a target to provide an enemy radar with false information when the signal transmitted by said enemy radar is present at said target comprising
    a primed oscillator including a circuit-which determines the natural oscillating frequency of the oscillator
    an antenna coupled to said circuit for providing a priming signal from the signal transmitted from said enemy radar, and for radiating the jamming signal
    means for rapidly turning said oscillator on and off, and
    means for altering the frequency of the oscillator output signal in a predetermined manner to induce a doppler-like frequency shift.

2. The jamming system of claim 1 and further including means for modulating the oscillator output signal in a predetermined manner to provide low frequency amplitude modulation of said output signal for inducing false bearing information into said output signal.

3. The jamming system of claim 1 wherein said means for altering the frequency of the oscillator output signal includes a variable phase shifter.

4. The jamming system of claim 1 wherein said frequency altering means includes a variable frequency phase shifter having two ports, and circulator means interposed between said antenna and said circuit, said circulator means having three ports with one port connected to said antenna and one port connected to said circuit, the port intermediate those connected to said antenna and said circuit being coupled to one port of said variable frequency phase shifter, the other port of said variable frequency phase shifter being shorted whereby depending on the direction of circulation of said circulator either the incoming signal is phase shifted or the output signal from said oscillator is phase shifted.

5. The jamming system of claim 1 and further including means for modulating the oscillator output signal in a predetermined manner to provide low frequency amplitude modulation of said output signal for inducing false bearing information into said output signal, said modulating means including means for turning said oscillator turn-on/turn-off means on and off in accordance with a predetermined modulation function.

6. The jamming system of claim 5 wherein said last mentioned means includes a source of power and means for periodically switching said source of power on and off to produce said modulation function.

7. The jamming system of claim 1 wherein said oscillator includes a diode and wherein said means for turning said oscillator on and off includes a keyed bias supply, said supply including means for supplying a bias voltage to said diode just under that necessary to render it operative and for periodically increasing said bias voltage to a level sufficient to render said diode operative thereby to turn on said oscillator.

8. The jamming system of claim 1 wherein said means for turning said oscillator on and off includes a power supply coupled to said oscillator and means for periodically shorting said frequency determining circuit thereby to periodically quench said oscillator.

9. The jamming system of claim 1 wherein said means for turning said oscillator on and off includes a power supply and means for selectively connecting said power supply to said oscillator.

10. The jamming system of claim 1 wherein the signal from said enemy radar is a CW signal and wherein said means for turning said oscillator on and off includes means for turning said oscillator on and off sufficiently rapidly such that the pulsed output signal from said oscillator approximates said CW signal and is detected as a CW signal at said enemy radar.

11. The jamming system of claim 10 wherein said last mentioned means operates at a frequency exceeding 1 KHz.

12. A jamming system adapted to be carried on board a target to provide an enemy radar with false information comprising
    an oscillator including a circuit which determines the natural oscillating frequency of the oscillator;
    an antenna coupled to said circuit;

means for rapidly turning said oscillator on and off; and means for modulating the oscillator output signal in a predetermined manner to provide low frequency amplitude modulation of said output signal for inducing false bearing information into said output signal.

13. A method of jamming an enemy radar which transmits electromagnetic energy towards a target and receives electromagnetic energy returned from said target comprising providing a unit including a primed and keyed oscillator primed with the electromagnetic energy transmitted by said enemy radar, which generates a pulse train of electromagnetic energy in which the phase of the signals within each pulse initially equals that of the priming signal used in priming the oscillator, the pulse repetition frequency of said pulse train being sufficiently rapid to prevent the detection of the pulsed nature of said pulse train at said receivers and varying the frequency of the signals within the pulse train in a manner which simulates a predetermined doppler frequency shift.

14. The method of claim 13 wherein said frequency varying step includes the step of varying the frequency of the priming signal.

15. The method of claim 13 wherein said frequency varying step includes the step of varying the frequency of the output signal from the oscillator.

16. The method of claim 13 wherein said frequency varying step includes the steps of varying the frequency of the priming signal and varying the frequency of the output signal from the oscillator.

17. The method of claim 13 and further including the step of amplitude modulating said pulse train in a manner such that false bearing information is imparted by the modulated pulse train.

18. The method of claim 17 wherein said amplitude modulating step includes the step of amplitude modulating said pulse train at a frequency commensurate with the conical scan frequency of the enemy radar.

* * * * *